Aug. 31, 1937.　　　W. E. PRIESTLEY　　　2,091,523
THRESHING MACHINE FEEDER
Filed March 4, 1935　　　4 Sheets-Sheet 2

INVENTOR
W. E. Priestley
BY Forest B. Hitchcock
ATTORNEY

Aug. 31, 1937.  W. E. PRIESTLEY  2,091,523
THRESHING MACHINE FEEDER
Filed March 4, 1935  4 Sheets-Sheet 3

INVENTOR
W. E. Priestley
BY
Forest B. Hitchcock
ATTORNEY

Patented Aug. 31, 1937

2,091,523

UNITED STATES PATENT OFFICE 2,091,523

THRESHING MACHINE FEEDER

William E. Priestley, Kendall, N. Y.

Application March 4, 1935, Serial No. 9,179

13 Claims. (Cl. 130—1)

This invention relates to threshing machines, and more particularly to feeders for use with threshing machines for vines bearing leguminous fruit.

It is desirable in threshing machines to have feeders associated therewith which supply an amount of vines, or other type of harvest, in an amount which the threshing chamber of the machine can readily handle. Also, such supply should be maintained below a predetermined maximum irrespective of the amount of material furnished the feeder by those manually placing the harvest therein. The operation of the feeder should also be of such a character as to remove stones and the like from the vines and to furnish the material to the threshing chamber in a manner that will avoid the fracture and bruising of the fruit.

In accordance with the present invention, one of the objects thereof is to provide a relatively slow moving feed regulating device which furnishes a supply to the threshing chamber of a threshing machine in an amount in accordance with the power required for such feeding, which power will be dependent upon the density and the toughness of the vines.

Another object of the invention is to provide a feeding mechanism which causes the matted vines as fed to the machine to be readily torn apart for the threshing chamber, which in accordance with the present invention is accomplished by the use of feeding teeth which tend to hold the vines and retard their free movement into the threshing chamber so that the quick action of the threshing cylinder teeth will have a positive tearing effect thereon. This separating action upon the vines is further facilitated by the use of retarding teeth which are oscillated back and forth in the flow of vines into the threshing cylinder.

Another object of the present invention is to provide a stone picking device which is readily adaptable to the feeding mechanism of the present invention and which separates the stones from the vines without harmful action thereon and without its positive action at times being the means of undesirably forwarding the stones and like refuse toward the threshing chamber of the machine.

Various other objects, purposes and characteristic features of the present invention will be in part obvious from the accompanying drawings, and in part pointed out as the description progresses.

In describing the invention in detail, reference will be made to the accompanying drawings, in which like reference characters designate corresponding parts through the several views, and in which:—

Fig. 5 is a top view of the governor of the driving mechanism illustrated in Fig. 1.

The threshing feeder of the present invention is constructed in a manner which readily adapts its use with any of the usual threshing machines now employed, it being understood that the cooperative relationships of the feeding mechanism of this invention with the threshing machine with which it is employed must be adapted in accordance with the principles of the present invention, and such other adaptations as are not set forth herein are considered to be a matter of design and mechanical skill.

The feeding mechanism and device has a suitable frame structure of angle iron and channel iron upon which the bearings of the various shafts of the mechanism may be readily mounted and upon which suitable sheet metal may be attached so as to render enclosed the parts of the device which directly operate upon the vines of the harvest supplied to the machine.

Figure 1:
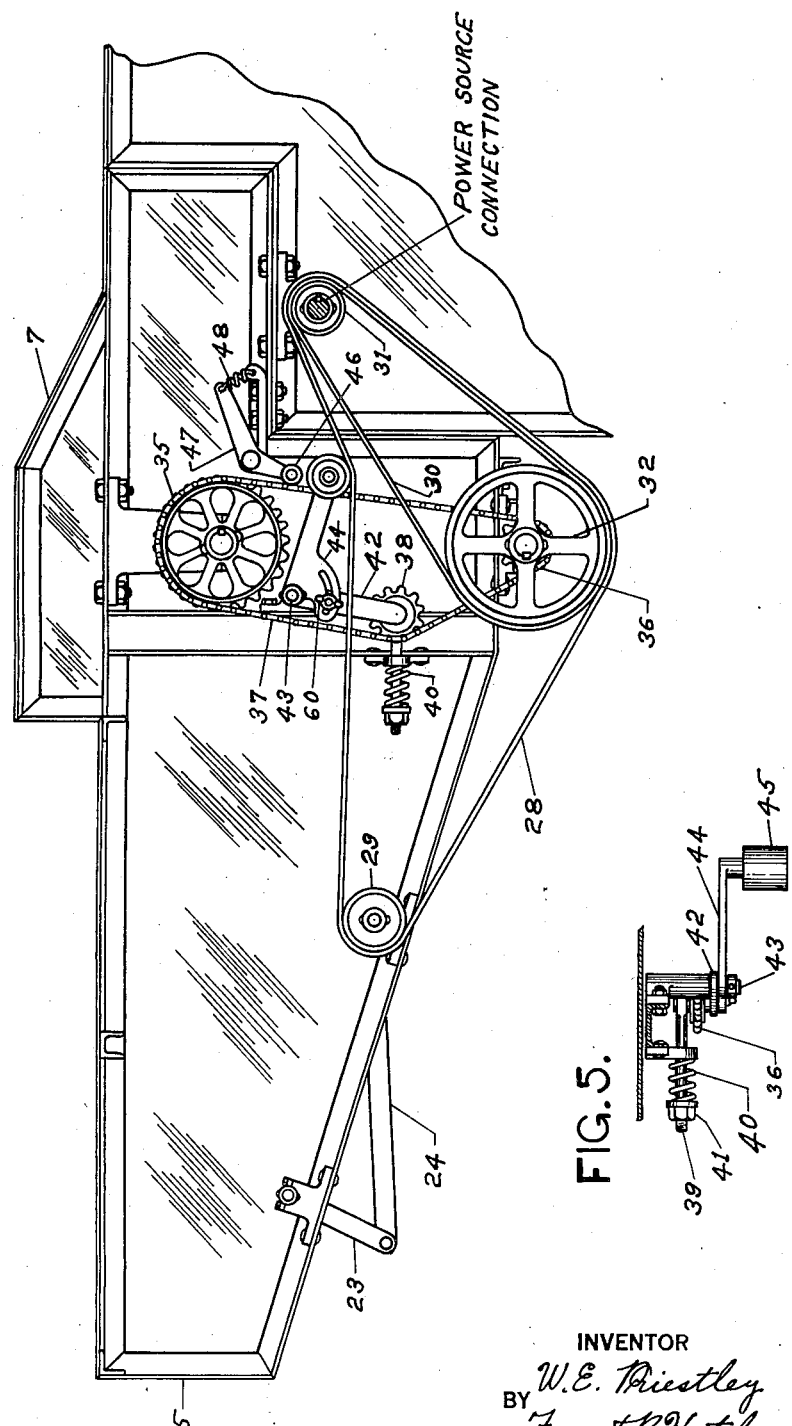
Fig. 1 shows an upright outside view of the feeding mechanism and drive therefor constructed in accordance with the present invention.
Figure 4:
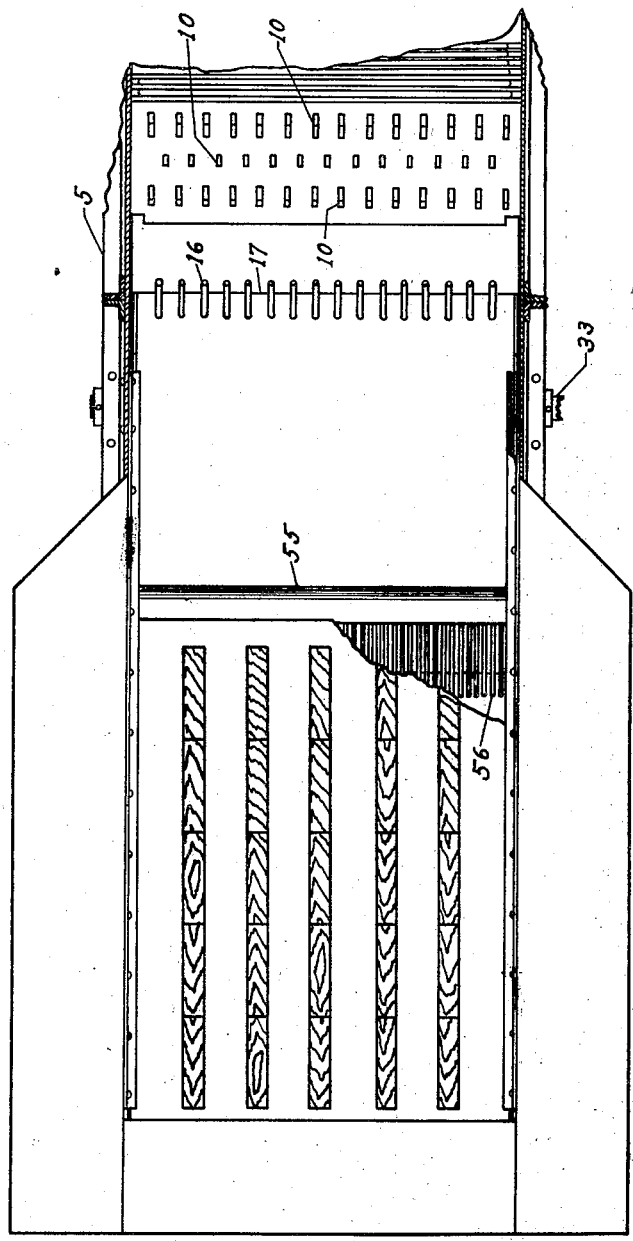
Fig. 4 is a fragmentary top view of the lower feed pan showing the feed pan retarder fingers and their relation to the fingers of the threshing cylinder.

With reference to Fig. 1 of the accompanying drawings, the framework 5 of the feeding mechanism is seen from a side view, while in Fig. 4 a top view is seen showing the deck which surrounds the opening to the upper feed pan 6. In this Fig. 4, the cover 7 of the feed cylinder is removed for the sake of bringing out the construction of the stone picking device and lower feed pan.

Figure 2:
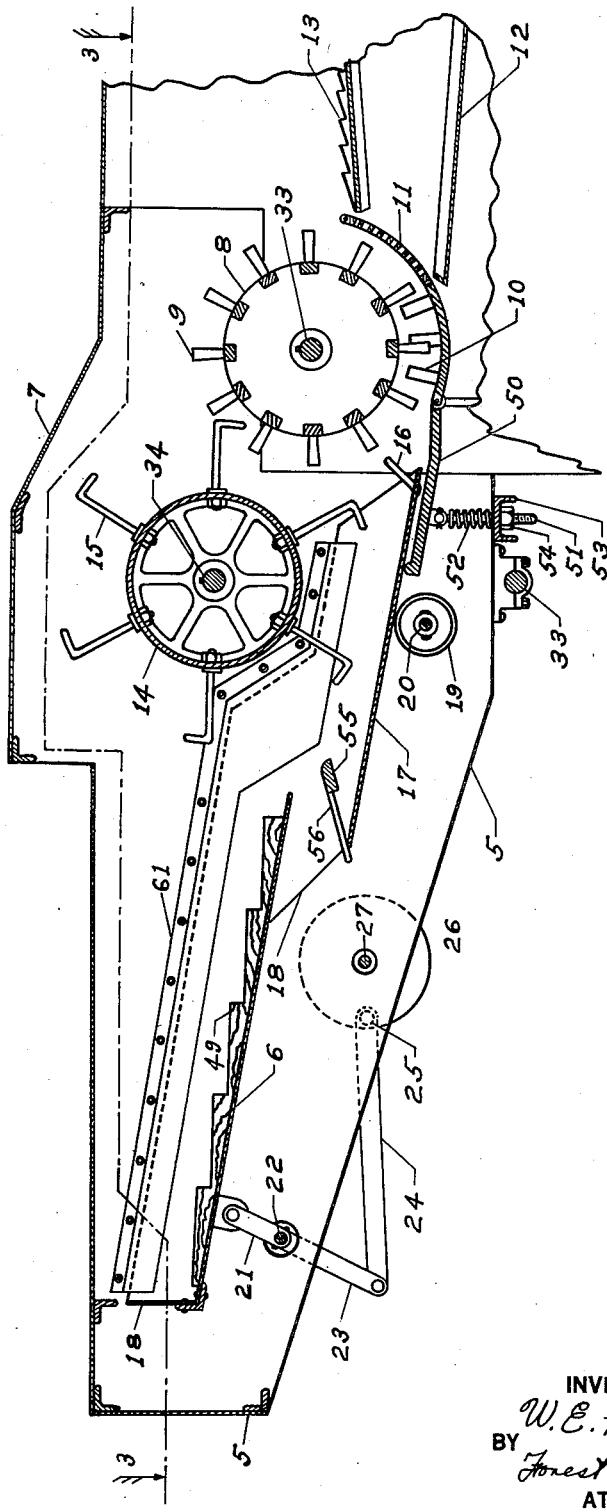
Fig. 2 shows a sectional view of the feeding mechanism constructed in accordance with the present invention, which section is taken on lines 2—2 of Fig. 3.

In Fig. 2, a threshing cylinder 8 is shown as having rows of teeth 9 which cooperate with teeth 10 of the threshing concaves in the threshing chamber and arranged as hereinafter described in greater detail. This threshing cylinder 8 is non-rotatably mounted on shaft 33. Facing the tangent of vine flow, a seed grate 11 is located which allows the threshed seeds to pass through onto a seed carrier 12, while a vine carrier 13 is provided to carry off the vines.

To the left of the threshing cylinder 8 is the feed cylinder 14 having mounted thereon feeding teeth 15, arranged as later described in greater detail, which cooperate with the teeth of the threshing cylinder and the teeth 16 of the lower feed pan 17, as later explained. This feed cylinder 14 is non-rotatably mounted on shaft 34.

The lower feed pan 17 and upper feed pan 6 are suitably mounted in parallel planes by side pieces 18 of the feed pan, which lower feed pan 17 rides upon suitable rollers 19 mounted upon shaft 20, while the upper feed pan 6 is supported on opposite sides by two arms 21 which are non-rotatably connected to shaft 22. The shaft 22 has non-rotatably connected thereto an arm 23 which is connected by an arm 24 to the off center bearing 25 on wheel 26. Mounted on the upper surface of the feed pan are suitable "fish back strips", so called, which are notched strips of wood 49 (or other suitable material) for causing the vines to be pushed toward the feed cylinder 14 to be engaged by the teeth 15 as the feed pan oscillates back and forth (see Figs. 2 and 3).

A dust skirt 61 is located on each side of the side wall of the framework 5, and overlaps the side pieces 18 of the feed pan as seen in Figs. 2 and 4. This dust skirt 61 has been removed from Fig. 3 for the sake of simplicity. There is a sufficient offset in the dust skirt 61 to allow free movement of the feed pan, which can be seen by the fragmentary section of the skirt shown in Fig. 4.

Interconnecting the side pieces 18 is a suitable bar 55 on a horizontal plane and located to the right of the end of the upper feed pan 6. Extending from this bar 55 are straight teeth 56 which are closely associated having sufficient space between them to allow the passage of the pods or legumes that may have become detached from the vines, but being sufficiently close together as to prevent the passage of stones or the like of any appreciable size (see Fig. 4).

The wheel 26 is mounted upon shaft 27 which is caused to rotate by reason of power supplied to it through a belt 28 (see Fig. 1) mounted upon pulley 29 which is non-rotatably connected to shaft 27. This rotation of the wheel 26 imparts oscillating motion to the feed pan through the arm 24.

With reference to Fig. 1, it would be seen that the belt 28 is a rider on belt 30 which connects the pulleys 31 and 32. The pulley 31 is non-rotatably mounted upon shaft 33 which is the support and driving means for the threshing cylinder 8, while the pulley 32 is non-rotatably mounted upon the shaft 33.

A suitable power source is connected to the shaft 33 for driving the feeding mechanism and the threshing machine with which it is associated, which has been merely indicated by a leg-end for the sake of simplicity.

The feed cylinder 14 is non-rotatably mounted upon shaft 34 which has non-rotatably mounted thereon a suitable sprocket 35. The shaft 33 also carries a sprocket 36, which sprockets 35 and 36 are interconnected by a chain 37 that is held taut upon the driving side of this chain interconnection by a sprocket 38. This idling sprocket is spring biased outwardly by a suitable tension bolt 39 by spring 40. The spring tension is adjustable by suitable lock nuts 41. The sprocket 38 is mounted on an arm 42 which is rotatably mounted on stub shaft 43 connected to the framework 5 of the feeder. Adjustably connected to the arm 42 and rotatable therewith is an arm 44 for supporting a pulley idler 45 which bears against the belt 28 in a manner to tighten the belt 28, as hereinafter described more in detail.

On the slack side of this chain drive connection is a suitable means for taking care of the varying amount of slack depending upon the position of the sprocket 38. This means has been illustrated as an idling roller 46 mounted on a pivoted arm 47 and spring biased against the chain 37 by spring 48. This spring 48 merely has sufficient tension to take care of the slack to maintain the chain in substantially steady movement.

The threshing concaves having teeth 10 are connected to the lower feed pan 17 by a suitable sub-pan 50 which is pivotably supported at the side connecting to the threshing concaves and at the other end has a raised portion which slidably contacts the lower feed pan 17. This sub-pan 50 is supported against the lower feed pan 17 by the spring biased push rod 51, that is, the push rod 51 is biased by spring 52 away from the channel iron 53 of the frame with a suitable adjustment by lock nuts 54 so that there is not undue friction between the sub-pan 50 and the lower feed pan 17, although there is sufficient contact to cause any of the legumes or threshed seeds which may escape the threshing concaves to remain within the enclosure without deformation and be taken towards the threshing chamber with the flow of vines as the feed pan oscillates back and forth.

Figure 3:
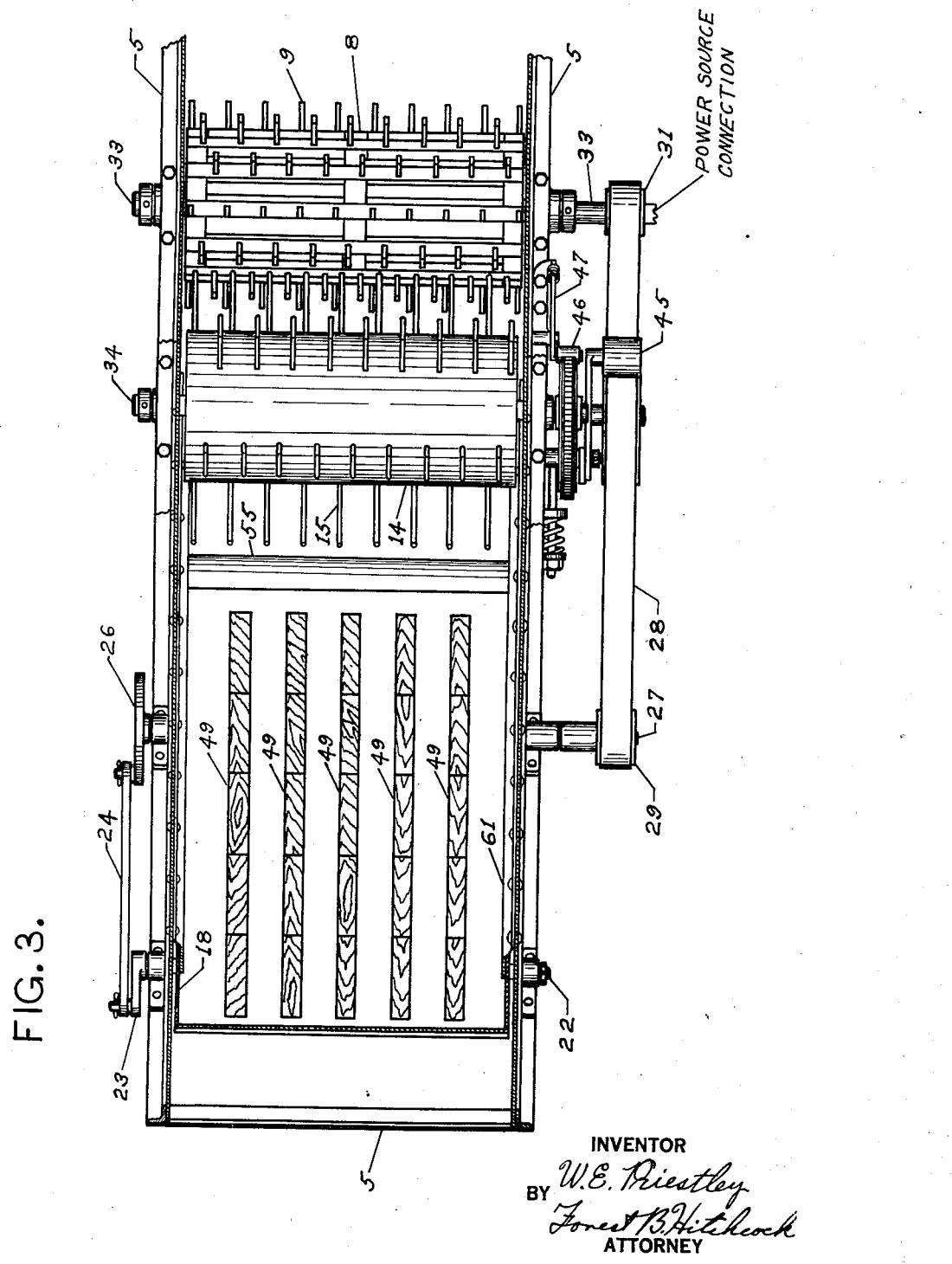
Fig. 3 is a top view of the structure embodying the present invention with certain parts removed and certain parts shown in section, which view may be considered as taken on lines 3—3 of Fig. 2.

With reference to Fig. 4, it will be seen that the teeth 10 of the threshing concaves are in rows which are offset, that is, the space between the teeth 10 in any row is twice the tooth spacing required when two rows are considered together and also has the width of a tooth in addition. The teeth 9 of the threshing cylinder 8 are likewise arranged in offset rows as seen in Fig. 3 and located to pass through the tooth spaces provided by the teeth 10 of the threshing concaves.

In a similar manner, the teeth 15 of the feed cylinder 14 are arranged in offset rows and located to pass through the spaces provided between the teeth 9 of the threshing cylinder 8.

It will be noted that the teeth of the feed and threshing cylinders have what may be termed a three row offset while the teeth of the concaves have what may be termed a two row offset.

It is believed that further description can best be set forth from the standpoint of operation and consideration of the functioning of the mechanism constructed in accordance with the principles of the present invention.

With reference to Fig. 2 of the accompanying drawings, let us assume that vines are being manually supplied to the upper feed pan and are engaged by the fish backs 49 so that the oscillatory motion pushes the vines towards the feed cylinder 14.

As the vines pass over the bar 55, any stones, lumps of dirt or other foreign matter, having settled to the bottom of the vines, will be caught in the pocket of the opening of the feed pan, and will be guided and forced out of the feed pan by the downward slope of the teeth 56. But any legumes will pass through the spaces between teeth 56 of the stone picking device and will fall on the lower feed pan 17 and will be carried toward the threshing chamber.

The passage of the vines over the stone picking device, including the bar 55 and teeth 56 as well as the suitable opening in the feed pan, causes the vines to be pushed toward teeth 15 of the feed cylinder and engaged thereby. As the teeth 15 enter into the vines, the density and toughness of the vines determines the power required for the teeth to enter, while the volume of the vines determines the friction between the vines carried by the teeth 15 and the lower feed pan. As the vines are carried along the lower feed pan on the teeth 15, they are engaged by the teeth 9 of the threshing cylinder 8 and are pulled into the concaves of the threshing chamber. Such vines as are engaged by the arms of the teeth 15 will be held by such teeth until the teeth 15 are actually wiped by the teeth 9 of the threshing cylinder, so that the rapid motion of the teeth of the threshing cylinder causes the vines to be torn apart. This is more readily understandable when it is appreciated that the threshing cylinder revolves at about 300 R. P. M. for example, while the feed cylinder revolves at about 30 R. M. P., for example.

The flow of vines from the feed cylinder 14 to the threshing cylinder 8 is further caused to be retarded by the retarding teeth 16 in a manner to cause the separation of the vines. These teeth 16 along the end of the feed pan are oscillated back and forth in the flow of vines. It will be readily apparent that when the feed pan is oscillated away from the threshing cylinder that the vines will be retarded to a greater extent by the teeth 15 in cooperation with the teeth 16, while, when the feed pan is oscillated toward the threshing cylinder, the release of the flow of vines will be accomplished so as to allow another free feed to the threshing cylinder except as with regards to the retardation supplied by the right angle arms of the teeth 15.

It will be seen that the retarder teeth 16 assist in keeping the vines on the teeth 15 when they are moved to the left, as seen in Fig. 2; but, when teeth 16 are moved to the right, the vines are shredded over the teeth 16 by the teeth 9 of the threshing cylinder. The teeth 16 are located on a slant with regard to the lower feed pan plane, so that they can be the more readily wiped clear by the teeth 15.

As the vines pass through the threshing chamber including the teeth 10 of the concaves and the teeth 9 of the threshing cylinder it will be apparent that the legumes will be torn loose from the vines and many of them broken so as to allow the seeds to escape passing through the seed grate 11 onto the seed carrier 12 while the vines are carried by the teeth of the threshing cylinder upward being thrown off at a tangent and caught by the vine carrier 13 of the threshing machine.

It is now time to consider the manner in which the flow of vines is regulated. Depending upon the power required for the pressure of the arms 15 into the vines plus the friction between the vines and the lower feed pan, plus the pull of the vines as they are torn away from the arms 15 and 16, the power necessary to rotate the feed cylinder 14 is determined. The driving torque of the feed cylinder 14 is received through the chain drive 37 riding over the sprocket 38 of the power governor, which causes the chain to tend to assume a straight line tangent to the sprockets 35 and 36. In other words, the power supplied from the sprocket 36 is divided into two components, namely, that component which supplies torque for the sprocket 36 and that component which acts to move the sprocket 38 counter clockwise around the shaft 43, which movement is against the spring 40. When the sprocket 38 is moved counter clockwise the idling pulley 45 is likewise moved counter clockwise removing the tension on belt 28 so that when the power required by the sprocket 35 is of a sufficient value to move the idling pulley 45 away from the belt 28, this belt is insufficiently tight to cause the pulley 29 to revolve, so that the feed pan ceases its oscillatory motion and stops feeding vines to the feed cylinder, except such as may have become already engaged by the teeth 15 of the feed cylinder.

As soon as the power required to rotate the feed cylinder 14 reduces to a value allowing the idler pulley 45 to engage the belt 28 to cause a sufficient tension, the pulley 29 begins rotation and the feed pan begins its operation. It is evident from this description and the construction of the apparatus, that the amount of vines fed to the feed cylinder and to the threshing chamber is wholly dependent upon the power involved and not upon volume or a change of speed in the feed cylinder as is the case in many machines of the prior art. It is also evident that the speed of the feed mechanism, which is of course directly associated with the operation of the threshing machine as a whole including the threshing cylinder 8, need not be changed, but in fact in accordance with the present invention remains substantially constant so that the amount of vines fed to the threshing cylinder is wholly dependent upon the power and is the only variable.

It may be noted in this connection that the flow of vines remains very constant although the operation of the feed pan is intermittent, this is because of the continual feeding of the vines which are closely interwoven even though the feed pan ceases operation. In other words, such vines as are connected sufficiently to hold together as engaged by the teeth 15 are carried towards the threshing cylinder in what may be termed a minimum vine flow to which a flow is added in accordance with the operation of the feed pan, an amount equal to that which the threshing cylinder can handle, which amount is determined by the adjustment of the power governor with respect to the power applied to the feed cylinder.

It will be evident that there are times when the vines which have passed through the threshing chamber do not release from the threshing cylinder at the tangent intended and carry around on the teeth 9 of the threshing cylinder, but in accordance with the present invention such carry-over is wiped clear by the teeth 15 of the feed cylinder 14 and are carried back over the top of the feed cylinder into the threshing chamber the second time. This is a desirable operation with regard to such vines as may be caught and held by the teeth of the threshing cylinder and is particularly well handled by the present invention inasmuch as such carry-over is caused to go through the power governor into the regular flow of vines. In other words, if there is a large quantity of carry-over, then the amount of regular flow is reduced by the power governor so that the total amount of vines fed to the threshing chamber is at all times dependent upon the power required as measured by the power governor.

It may be noted in this connection that the adjusting of the lock nut 41 determines the amount of power necessary to operate the idling pulley 45 any given distance so as to release the friction against the pulley 29 at the desired point. As the belt 28 is stretched or when the belts are replaced the initial adjustment or position of the idling pulley 45 can be readily taken care of by relative movement of the arms 42 and 45, which arms are held in position by the lock bolt and nut 69. It may be noted in this connection that when the feeding mechanism of the present invention is initially applied to a threshing machine, the power adjustment will be made, but once it is set such adjustment will remain and any changes will then be made by the adjustment of the idling pulley 45 to determine that the pulley 29 will begin to slip when the idling pulley 45 has been moved through a given arc.

It is to be understood that the threshing machine handles the threshed legumes and seed in the usual manner by passing them through a fanning mill, and that any legumes which are not opened and the seed removed therefrom by the first threshing cylinder may be passed through a second threshing cylinder by means of an elevator or may be returned to the first threshing cylinder by a suitable elevator. Likewise, the vines which fall on the vine carrier 13 may be passed through a second threshing chamber or may be carried directly to the blower removing the vines outside of the machine to a stack in the usual way, all of which is omitted from the present disclosure except in this general way as it is well understood in the art how this may be done.

It appears to be only necessary to point out in this connection that with the well regulated flow of vines as determined by the feeder of the present invention, the threshing machine is maintained in a constant degree of operation and there is a minimum amount of the return of legumes through the elevator and there is a minimum amount of carry-over of vines which may have legumes still attached thereto. In other words, the threshing machine to which the present invention is applied is rendered much more efficient by the feeder of the present invention by reason of the regulation of the flow of vines in accordance with the power required by the machine rather than in accordance with volume as has been done in many machines of the prior art.

It is further noticed that this governing of the feed of the vines in accordance with power is so arranged that the amount of power at which the feed shuts off is well below the amount of power that can be supplied by the driving source without materially affecting the speed of operation of the whole threshing machine including the feeding mechanism constructed in accordance with the present invention. This has the distinct advantage that the fanning mill and other parts of the threshing machine remain in operation at their regulated speed so as to be most efficient, where in other types of feeders, the speed of the machine varies in accordance with the amount of vines manually fed to the machine so that the threshing machine is continually off its most efficient point of operation. This is particularly true in threshing machines employing speed governors for the feed.

It is to be understood that other forms of a power governor may be employed and still be within the scope of the present invention. Also, a friction clutch and positive type drive can be employed for the feed pan instead of the control of belt slippage as shown in the present disclosure because of its simplicity. The system of drive can also be arranged so that the power governor measures the driving power of both the feed cylinder and the threshing cylinder, to thereby control the feed pan, and still be included in the scope of the present invention.

Having thus described a feeder for a threshing machine as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention except as limited by the appended claims.

What I claim is:—

1. In combination with a threshing machine for vines bearing leguminous fruit, a threshing cylinder having rows of spaced teeth, driving means for rotating at a relatively fast speed said threshing cylinder in a particular direction to cause the passage of vines through a threshing chamber, a feed cylinder, rows of teeth on said feed cylinder spaced to pass through the spaces between said teeth of said threshing cylinder, said teeth having hooked projections extending in a direction opposite to the direction of rotation for said feed cylinder, means for rotating at a relatively slow speed said feed cylinder in said particular direction to thereby feed vines to said threshing cylinder, and a conveyor for supplying said feed cylinder with vines.

2. In combination with a threshing machine for vines bearing leguminous fruit, a threshing cylinder having rows of spaced teeth, driving means for rotating in a particular direction at a relatively fast speed said threshing cylinder to cause the passage of vines through a threshing chamber, a feed cylinder, rows of teeth on said feed cylinder spaced to pass through the spaces between said teeth of said threshing cylinder, means for rotating at a relatively slow speed said feed cylinder to thereby feed vines to said threshing cylinder, a rack of teeth located between said threshing and feed cylinders to thereby partially obstruct the flow of vines, means for oscillating said rack of teeth between said feed and threshing cylinders, whereby vines are torn by said teeth in co-action with said threshing cylinder, and whereby vines are maintained in contact with said feed cylinder, and a conveyor for supplying said feed cylinder with vines.

3. In combination with a threshing machine for vines bearing leguminous fruit, a threshing cylinder having rows of spaced teeth, driving means for rotating at a relatively fast speed, said threshing cylinder in a particular direction to cause the passage of vines through a threshing chamber, a feed cylinder having rows of spaced teeth which pass between the spaced teeth of said threshing cylinder, means for rotating at a relatively slow speed said feed cylinder in said particular direction, a feed pan beneath said feed cylinder and extending therefrom for receiving vines, a rack of teeth located between said threshing and feed cylinders and attached to said feed pan, and means for reciprocally moving said feed pan, whereby said rack of teeth partially obstructs the flow of vines and oscillates back and forth in such flow to tear the vines apart.

4. In combination with a threshing machine for vines bearing leguminous fruit, a threshing cylinder having rows of spaced teeth, driving means for rotating at a relatively fast speed, said threshing cylinder in a particular direction to cause the passage of vines through a threshing chamber, a feed cylinder having rows of spaced teeth which pass between the spaced teeth of said threshing cylinder, means for rotating at a relatively slow speed said feed cylinder in said particular direction, a feed pan beneath said feed cylinder and extending therefrom for receiving vines, notched ribs on said feed pan, and means for reciprocally moving said feed pan when and only when the power required to rotate said feed cylinder is below a predetermined value.

5. In combination, a threshing cylinder having rows of spaced teeth, threshing concaves having rows of spaced teeth cooperating with said spaced teeth of said threshing cylinder, a feed cylinder having rows of spaced teeth cooperating with said teeth of said threshing cylinder to pass through the spaces between said spaced teeth of said threshing cylinder, said teeth of said feed cylinder having L-shaped ends with the feet trailing the direction of rotation for entering the material to be fed to said threshing cylinder, a conveyor located adjacent said feed cylinder, whereby the material being fed to said threshing cylinder must be entered by said L-shaped teeth of said feed cylinder, and means for driving said threshing and feed cylinders in the same direction but at relative fast and slow speeds respectively.

6. In combination, a feed cylinder having rows of spaced teeth for supplying vines bearing leguminous fruit to a threshing chamber, driving means for rotating said feed cylinder at a substantially constant speed, a conveyor for, when operated, supplying vines to said feed cylinder, and means for operating said conveyor when and only when the power required to rotate said feed cylinder is below a predetermined value.

7. In combination, a feed cylinder having rows of spaced teeth for supplying vines bearing leguminous fruit to a threshing chamber, driving means for rotating said feed cylinder at a substantially constant speed, a conveyor for, when operated, supplying vines to said feed cylinder, driving means supplying power for operating said conveyor, a frictional connection between said driving means and said conveyor, and means for causing said frictional connection to slip only when the power required to rotate said feed cylinder is above a predetermined value.

8. In combination with a threshing machine, threshing concaves having stationary teeth, a threshing cylinder having rows of spaced teeth for cooperating with the teeth of said concaves, driving means for rotating said threshing cylinder in a particular direction at a relatively fast speed, a feed cylinder, driving means for rotating said feed cylinder in said particular direction at a relatively slow speed, and teeth on said feed cylinder for cooperating with said teeth on said threshing cylinder to pass through the spaces between said spaced teeth of said threshing cylinder, said teeth having hooked projections extending in a direction opposite to said particular direction of rotation.

9. In combination with a threshing machine, threshing concaves having stationary teeth, a threshing cylinder having rows of spaced teeth for cooperating with the teeth of said concaves, driving means for rotating at a relatively fast speed said threshing cylinder in a particular direction to cause the flow of vines through said threshing concaves, a feed cylinder located on that side of said threshing cylinder which is the entering side for vines to said threshing concaves, driving means for rotating said feed cylinder in said particular direction at a relatively slow speed, teeth on said feed cylinder for passing between the teeth on said threshing cylinder, said teeth having hooked projections extending in a direction opposite to said particular direction, a rack of teeth, said teeth on said rack standing obliquely in the flow of vines between said feed cylinder and said threshing cylinder, and driving means for reciprocally moving said rack of teeth.

10. In combination, a threshing cylinder having rows of spaced teeth, threshing concaves having rows of spaced teeth cooperating with said spaced teeth of said threshing cylinder, a feed cylinder having rows of spaced teeth cooperating with said teeth of said threshing cylinder to pass through said spaces between said teeth of said threshing cylinder, said teeth of said feed cylinder having L shaped ends for entering the material to be fed to said threshing cylinder, and said ends pointed in a direction opposite to the direction of rotation of said feed cylinder, means for driving said threshing and said feed cylinders in the same direction but at relatively fast and slow speeds respectively, and a conveyor located adjacent said feed cylinder for supplying material beneath said feed cylinder to be passed on by the teeth of said feed cylinder to said threshing cylinder, whereby a continuous tearing action is maintained on the material with respect to the teeth of said feed cylinder entering the material until such teeth intermesh with the teeth of said threshing cylinder.

11. In combination, a threshing cylinder having rows of spaced teeth, threshing concaves having rows of spaced teeth cooperating with said spaced teeth of said threshing cylinder, a feed cylinder having rows of spaced teeth cooperating with said teeth of said threshing cylinder to pass through said spaces between said teeth of said threshing cylinder, said teeth of said feed cylinder having L shaped ends for entering the material to be fed to said threshing cylinder and said ends being pointed in a direction opposite to the direction of rotation of said feed cylinder, means for driving said threshing and said feed cylinder in the same direction but at relatively fast and slow speeds respectively, a conveyor located adjacent said feed cylinder for supplying material beneath said feed cylinder to be passed on by the teeth of said feed cylinder to said threshing cylinder, whereby a continuous tearing action is maintained on the material with respect to the teeth of said feed cylinder entering the material until such teeth intermesh with the teeth of said threshing cylinder, a rack of teeth located between said threshing and feed cylinders and beneath the intermeshing portion of their teeth, said teeth on said rack standing obliquely in the flow of material between said feed and threshing cylinders, and means for reciprocably moving said rack of teeth between said threshing and feed cylinders in a manner to cause a tearing action on said material as said rack of teeth cooperates with said threshing cylinder and to cause said material to be maintained on said teeth of said feed cylinder as said rack of teeth cooperates with said feed cylinder teeth.

12. In combination with a threshing machine, a threshing cylinder having rows of spaced teeth, a feed cylinder having rows of spaced teeth which pass between the spaced teeth of said threshing cylinder, a conveyor for supplying material to be threshed to said feed cylinder only when power driven, a single source of power operatively connected to drive said feed and threshing cylinders, and mechanical means connecting said conveyor to said source of power so as to be power driven only when the power consumed by said feed cylinder alone is below a predetermined value.

13. In combination, a threshing cylinder having rows of spaced teeth, threshing concaves having rows of spaced teeth cooperating with said spaced teeth of said threshing cylinder, a feed cylinder having rows of spaced teeth cooperating with said teeth of said threshing cylinder to pass through the spaces between said teeth of said threshing cylinder, said teeth of said feed cylinder having L-shaped ends with the feet trailing the direction of rotation and forming right angles with the legs of the teeth, a flat feed pan located beneath and relatively close to said feed cylinder teeth, whereby the material fed to said threshing cylinder must be slidingly entered by said L-shaped teeth of said feed cylinder, and whereby the material is held by said L-shaped teeth and torn apart as it passes into said threshing concaves, and means for driving said threshing and feed cylinders in the same direction but at relatively fast and slow speeds respectively.

WILLIAM E. PRIESTLEY.